(12) United States Patent
Imamura et al.

(10) Patent No.: US 8,953,124 B2
(45) Date of Patent: Feb. 10, 2015

(54) OPTICAL SYSTEM

(75) Inventors: Kentarou Imamura, Osaka (JP); Shigeto Yoshida, Osaka (JP); Takafumi Shimatani, Osaka (JP); Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 13/643,622

(22) PCT Filed: Apr. 26, 2011

(86) PCT No.: PCT/JP2011/060152
§ 371 (c)(1),
(2), (4) Date: Oct. 26, 2012

(87) PCT Pub. No.: WO2011/136214
PCT Pub. Date: Nov. 3, 2011

(65) Prior Publication Data
US 2013/0038826 A1  Feb. 14, 2013

(30) Foreign Application Priority Data

Apr. 28, 2010 (JP) ................................. 2010-104394

(51) Int. Cl.
G02F 1/1335 (2006.01)
G02B 5/136 (2006.01)
G02B 17/00 (2006.01)
G02B 27/22 (2006.01)

(52) U.S. Cl.
CPC .............. G02B 17/006 (2013.01); G02B 5/136 (2013.01); G02B 27/2292 (2013.01); G02F 1/133553 (2013.01)
USPC ........................ 349/113; 359/485.01; 359/546

(58) Field of Classification Search
CPC .. G02B 5/136; G02B 27/2292; G02B 17/006; G02F 1/133553
USPC ............ 349/11, 113; 359/13, 485.01, 485.02, 359/546, 629, 630, 633
See application file for complete search history.

(56) References Cited

U.S. PATENT DOCUMENTS 7,839,574 B2 * 11/2010 Okada et al. .................. 359/630
7,965,448 B2    6/2011 Maekawa
(Continued)

FOREIGN PATENT DOCUMENTS

JP        06273608 A    9/1994
JP        08169257 A    7/1996
(Continued)

OTHER PUBLICATIONS

International Preliminary Report on Patentability dated Dec. 20, 2012.
(Continued)

*Primary Examiner* — Dung Nguyen
*Assistant Examiner* — Tai Duong
(74) *Attorney, Agent, or Firm* — Harness, Dickey & Pierce, P.L.C.

(57) ABSTRACT

An optical system according to an embodiment of the present invention includes a reflective imaging element having a first principal face which is struck by light emitted from a display panel, a second principal face parallel to the first principal face, and two mutually-orthogonal specular elements being perpendicular to the first principal face, and causes an image displayed on a display surface of the display panel to form an image at a position of planar symmetry with respect to the reflective imaging element as a plane of symmetry. A transparent substrate which is disposed on at least either the first principal face side or the second principal face side of the reflective imaging element is further included, and first light striking the transparent substrate is linearly polarized light, with a large proportion of p-polarized light.

16 Claims, 9 Drawing Sheets

(56) References Cited

U.S. PATENT DOCUMENTS

| 2001/0047846 A1 | 12/2001 | Currens et al. |
| 2009/0310231 A1 | 12/2009 | Maekawa |
| 2010/0214394 A1 | 8/2010 | Maekawa |
| 2010/0231860 A1 | 9/2010 | Maekawa |
| 2011/0235201 A1 | 9/2011 | Maekawa |

FOREIGN PATENT DOCUMENTS

| JP | 2003517629 A | 5/2003 |
| JP | 2008-158114 A | 7/2008 |
| JP | 2009-025776 A | 2/2009 |
| JP | 2009-042337 A | 2/2009 |
| JP | 2009-075483 A | 4/2009 |
| JP | 2009-276699 A | 11/2009 |
| WO | WO-2007/116639 A1 | 10/2007 |
| WO | WO-2011052588 A1 | 5/2011 |

OTHER PUBLICATIONS

Javidi, B. et al. "Three-Dimensional TV, Video, and Display V," *Proceedings of SPIE*, Oct. 3-4, 2006, vol. 6392, p. 1-8. Boston, MA.
International Search Report PCT/ISA/210 for International Application No. PCT/JP2011/060152 dated May 23, 2011.

* cited by examiner

FIG.2
(a)
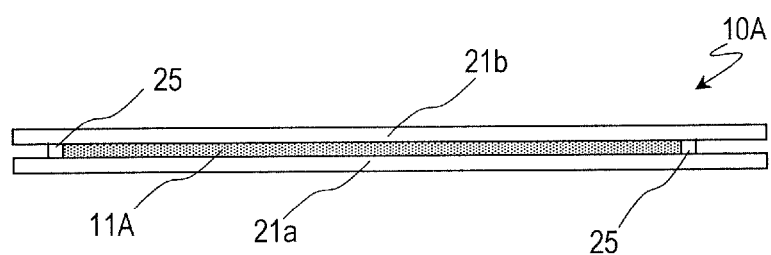
(b)
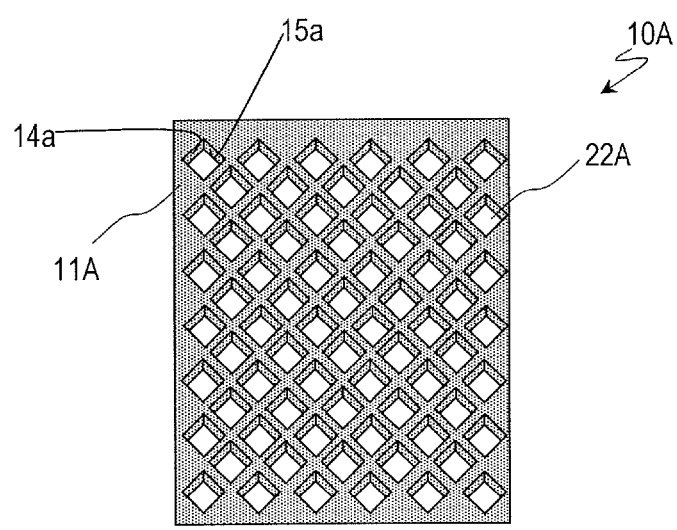
(c)
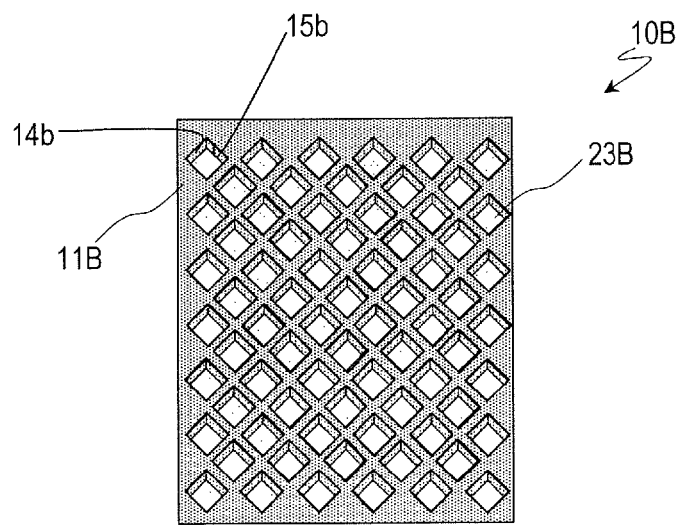

FIG. 3
(a)
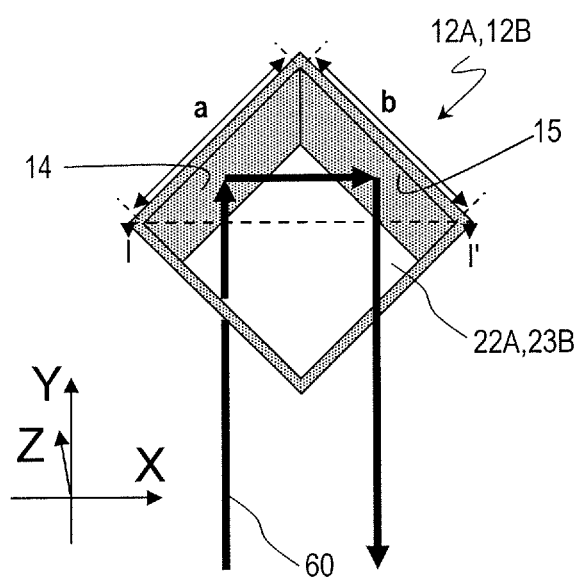
(b)
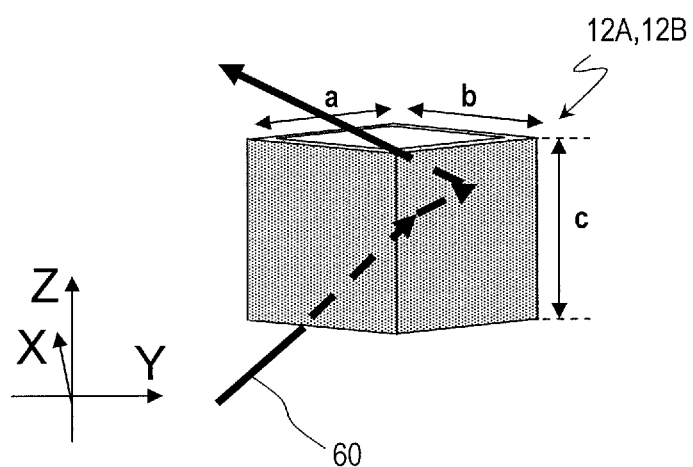

FIG.4
(a)
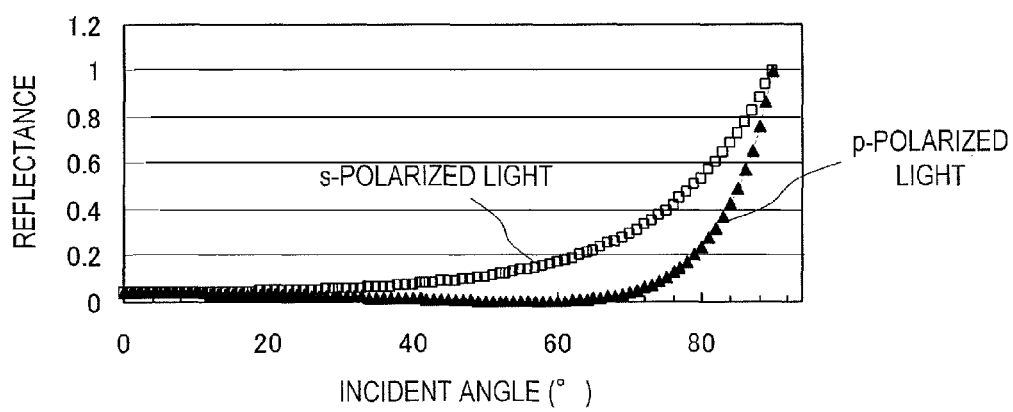
(b)
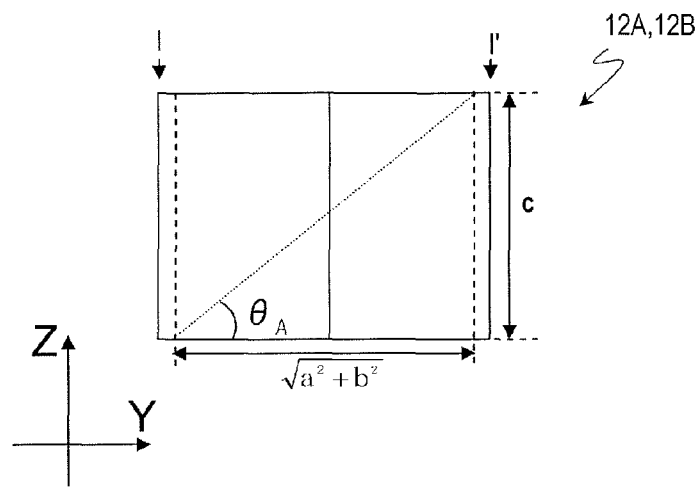
(c)
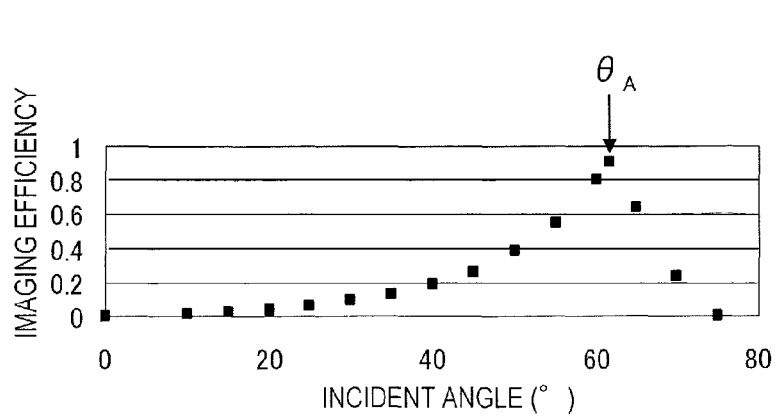

FIG.5
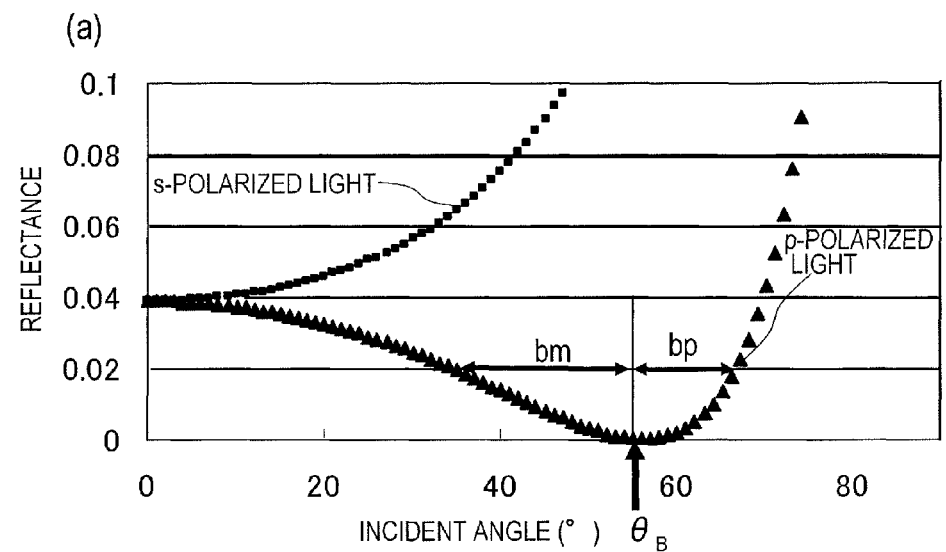
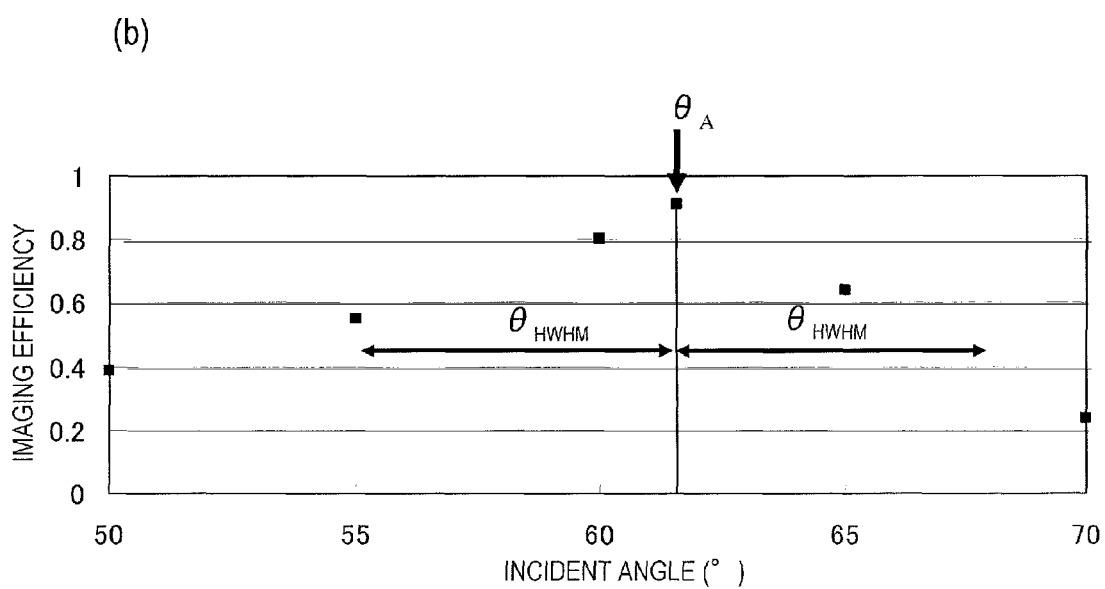

FIG.6
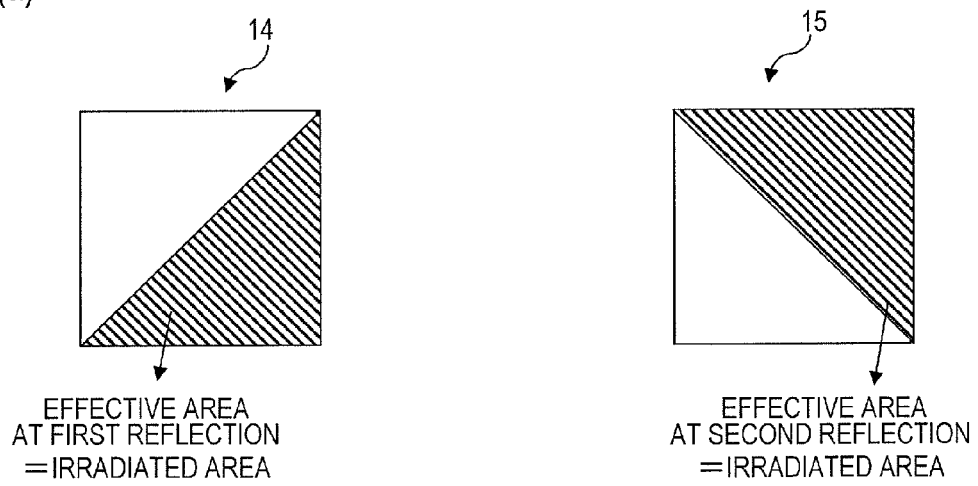
(a)
EFFECTIVE AREA
AT FIRST REFLECTION
= IRRADIATED AREA
EFFECTIVE AREA
AT SECOND REFLECTION
= IRRADIATED AREA
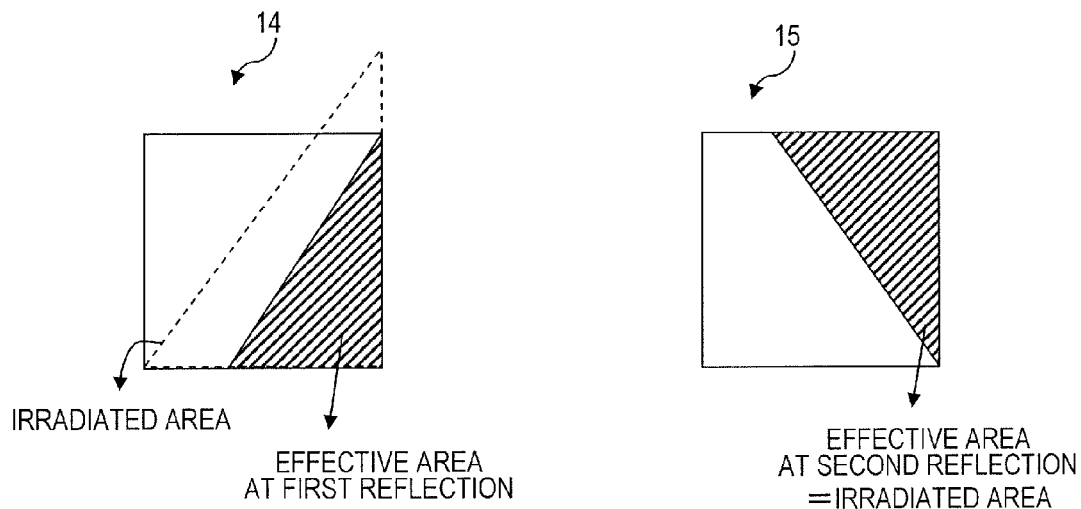
(b)
IRRADIATED AREA
EFFECTIVE AREA
AT FIRST REFLECTION
EFFECTIVE AREA
AT SECOND REFLECTION
= IRRADIATED AREA FIG. 7
(a)
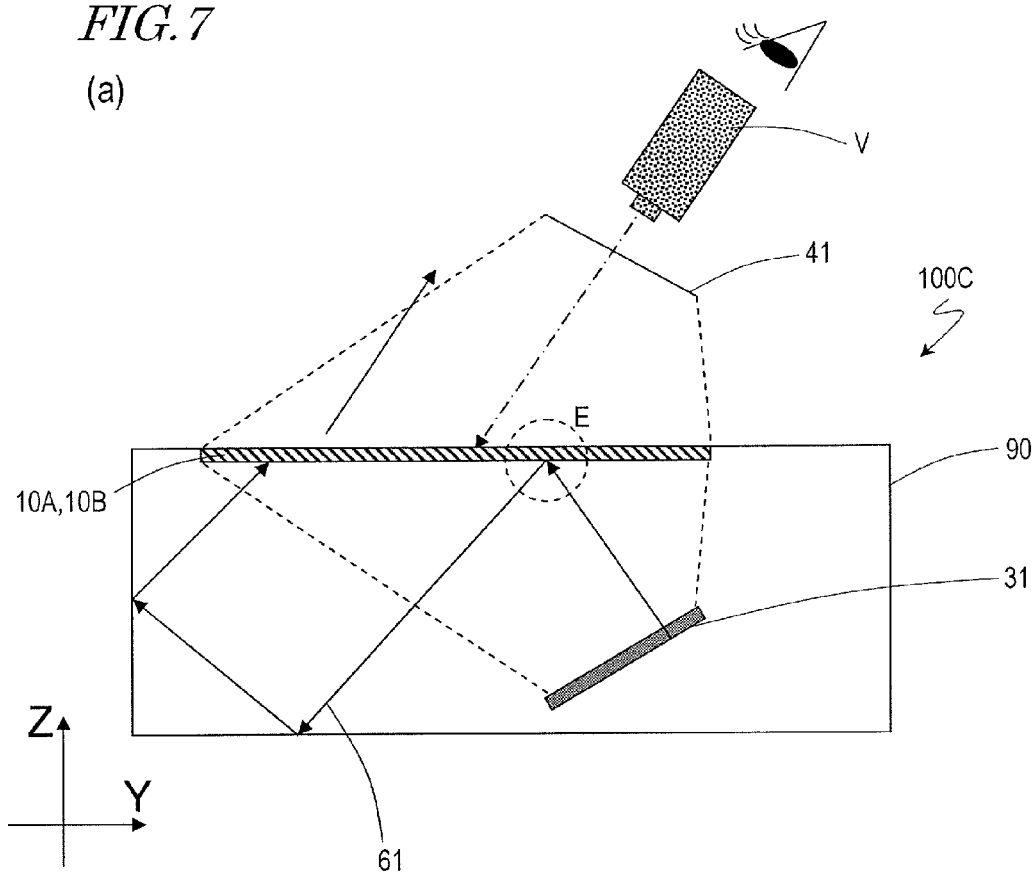
(b)
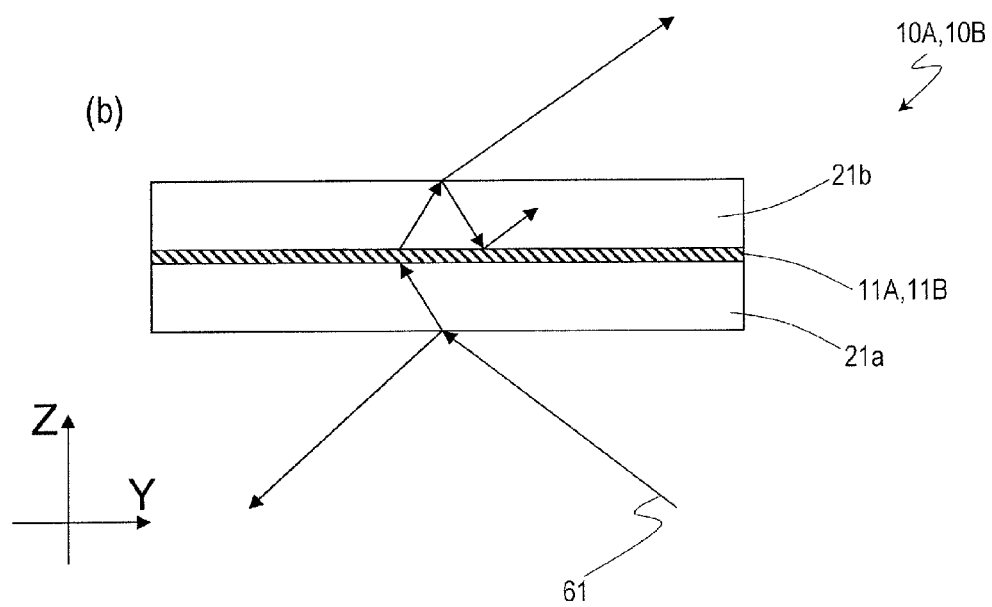

FIG.9
(a)
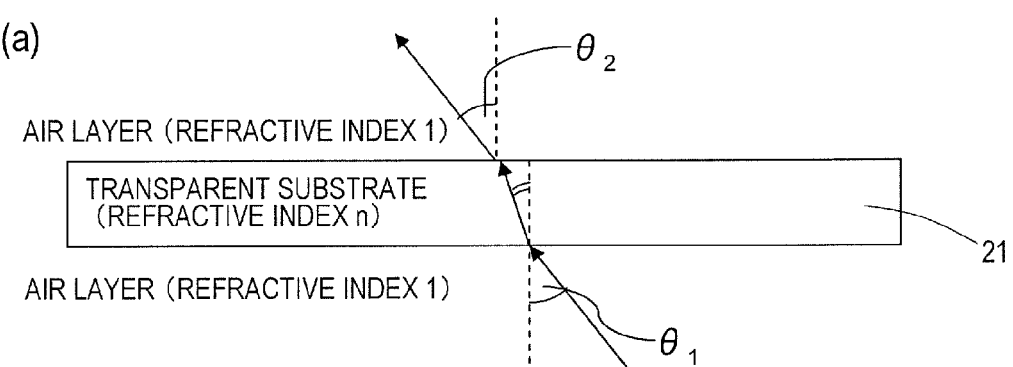
(b)
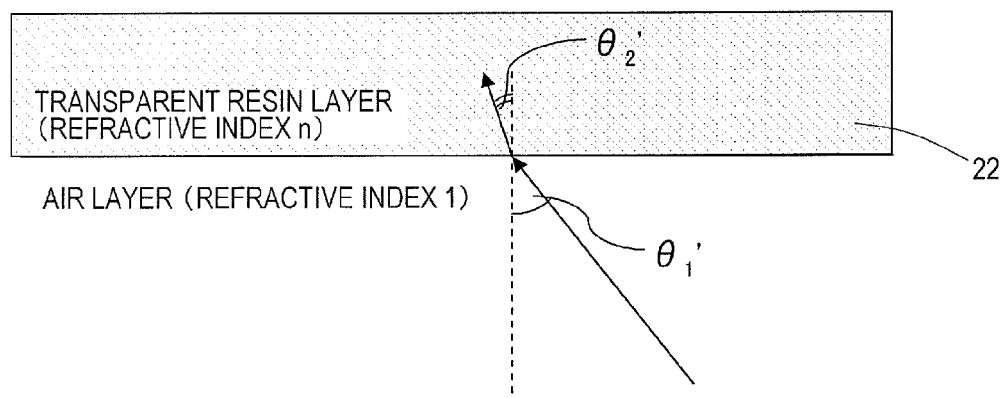
(c)
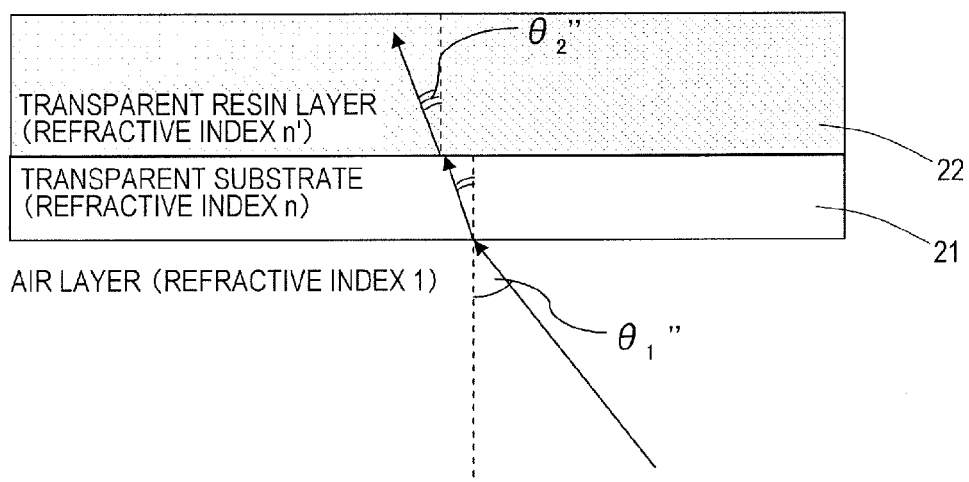

OPTICAL SYSTEM

TECHNICAL FIELD

The present invention relates to an optical system having a reflective imaging element which is capable of forming an image of an object in a space and a display panel.

BACKGROUND ART

In recent years, an optical system for forming an image of an object in a space by using a reflective imaging element has been proposed (for example, Patent Documents 1 to 6). The optical system includes a reflective imaging element and an object, and an image to be displayed in a space is an image of the object, which forms at a position of planar symmetry with respect to the reflective imaging element as a plane of symmetry.

The reflective imaging element disclosed in Patent Document 1 has a plurality of throughholes penetrating through a plate-like substrate along its thickness direction, such that an optical element composed of two orthogonally-disposed specular elements is formed on the inner walls of each hole (see FIG. 4 of Patent Document 1), or has a plurality of transparent chimneys protruding in the thickness direction of the substrate, such that an optical element composed of two orthogonally-disposed specular elements is formed on the inner wall surface of each chimney (see FIG. 7 of Patent Document 1).

In the reflective imaging elements disclosed in Patent Documents 1, 2, and 5, tens to hundreds of thousands of square holes, each of whose sides measures about 50 μm to 1000 μm, are formed in a substrate having a thickness of 50 μm to 1000 μm, the inner surface of each hole being mirror coated by electroforming technique, nanoprinting technique, or sputtering technique.

An optical system in which a reflective imaging element is used utilizes specular reflection of the reflective imaging element, and, according to its principles, the ratio in size between the image of the object and the image appearing in the space is 1:1.

For reference sake, the entire disclosure of Patent Documents 1 to 6 is incorporated herein by reference.

CITATION LIST

Patent Literature

[Patent Document 1] Japanese Laid-Open Patent Publication No. 2008-158114
[Patent Document 2] Japanese Laid-Open Patent Publication No. 2009-75483
[Patent Document 3] Japanese Laid-Open Patent Publication No. 2009-42337
[Patent Document 4] Japanese Laid-Open Patent Publication No. 2009-25776
[Patent Document 5] International Publication No. 2007/116639
[Patent Document 6] Japanese Laid-Open Patent Publication No. 2009-276699

SUMMARY OF INVENTION

Technical Problem

In the aforementioned optical system, when an object is placed with a tilt relative to the reflective imaging element, the image (hereinafter referred to as an "aerial image") appearing in the air also becomes angled, thus producing an effect of an aerial image floating in the space (PCT/JP2010/068966). Moreover, as the tilting angle of the object relative to the reflective imaging element is increased, a more upright image is formed as an aerial image in the air, whereby an image with enhanced reality can be displayed.

When an image which is displayed on a display panel is used as the object, the image which is displayed on the display panel appears upright in the air. Therefore, even though the image displayed on the display panel is a two-dimensional image, an aerial image would appear floating in the space to the viewer, thus resulting in a perception as if a three-dimensional image were being displayed in the air. In the present specification, an image which is perceived by a viewer as if a three-dimensional image were floating in the air in this manner may be referred to as an "airy image". For reference sake, the entire disclosure of PCT/JP2010/068966 is incorporated herein by reference.

In the above optical system, as the tilting angle of the object relative to the reflective imaging element is increased, a more upright image is formed as an aerial image in the air, thus producing greater airiness. However, studies of the inventors have found a problem in that, depending on the structure of the reflective imaging element, increasing the tilting angle of the object may lead to an increase in the intensity of reflected light not contributing to image formation, such reflected light occurring at interfaces between media with different refractive indices, etc., thus deteriorating the contrast ratio of the aerial image.

The present invention has been made in order to solve the above problem, and an objective thereof is to provide an optical system having a reflective imaging element in which reflected light not contributing to image formation is reduced and whose imaging efficiency is improved.

Solution to Problem

An optical system according to the present invention is an optical system comprising: a display panel; and a reflective imaging element having a first principal face on which light emitted from the display panel is incident, a second principal face parallel to the first principal face, and two mutually-orthogonal specular elements being perpendicular to the first principal face, the optical system causing an image displayed on a display surface of the display panel to form an image at a position of planar symmetry with respect to the reflective imaging element as a plane of symmetry, wherein, the optical system further comprises a transparent substrate which is disposed on at least either the first principal face side or the second principal face side of the reflective imaging element; first light incident on the transparent substrate is linearly polarized light; and, given a proportion $R_p$ of p-polarized light and a proportion $R_s$ of s-polarized light in the first light incident on the transparent substrate, the proportion $R_p$ of p-polarized light satisfies $R_p \times r_p(\theta) < r_0 \times (R_p + R_s) - R_s \times r_s(\theta)$, where: $r_0$ is a reflectance for light perpendicularly incident on the transparent substrate; and $r_p(\theta)$ is a reflectance for p-polarized light, and $r_s(\theta)$ is a reflectance for s-polarized light, of the first light when the first light is incident on the transparent substrate at an incident angle $\theta$. Note that, in the range $0° < \theta < 90°$, $0 \le R_p, R_s \le 1$, $R_p + R_s = 1$, $0 < r_0 < 1$, $0 \le r_p(\theta) < 1$, $0 < r_s(\theta) < 1$ are satisfied.

In one embodiment, the reflective imaging element includes a plate-like substrate having a plurality of throughholes along a thickness direction, and a transparent member filling the plurality of holes, and includes a transparent substrate only on the first principal face side, or on both the first principal face side and the second principal face side.

In one embodiment, the first light incident on the transparent substrate is composed only of p-polarized light.

In one embodiment, given a reflectance $r^0_p$ for p-polarized light when light which is perpendicular to the transparent substrate is incident on the transparent substrate, the incident angle $\theta$ is an incident angle $\theta_1$ such that a reflectance $r_p(\theta)$ of the p-polarized light is equal to or less than $r^0_p/2$.

In one embodiment, the incident angle $\theta$ is Brewster's angle.

Another optical system according to the present invention is an optical system comprising: a display panel; and a reflective imaging element having a first principal face on which light emitted from the display panel is incident, a second principal face parallel to the first principal face, and two mutually-orthogonal specular elements being perpendicular to the first principal face, the optical system causing an image displayed on a display surface of the display panel to form an image at a position of planar symmetry with respect to the reflective imaging element as a plane of symmetry, wherein, the reflective imaging element includes a plate-like substrate having a plurality of throughholes along a thickness direction, and a transparent member filling the plurality of holes, first light incident on the transparent member is linearly polarized light; and, given a proportion $R_p$ of p-polarized light and a proportion $R_s$ of s-polarized light in the first light incident on the transparent member, the proportion $R_p$ of p-polarized light satisfies $R_p \times r_p(\theta) < r_0 \times (R_p + R_s) - R_s \times r_s(\theta)$, where: $r_0$ is a reflectance for light perpendicularly incident on the transparent member; and $r_p(\theta)$ is a reflectance for p-polarized light, and $r_s(\theta)$ is a reflectance for s-polarized light, of the first light when the first light is incident on the transparent member at an incident angle $\theta$. Note that, in the range $0° < \theta < 90°$, $0 \le R_p$, $R_s \le 1$, $R_p + R_s = 1$, $0 < r_0 < 1$, $0 \le r_p(\theta) < 1$, $0 < r_s(\theta) < 1$ are satisfied.

In one embodiment, the optical system further comprises a transparent substrate disposed on the second principal face side of the reflective imaging element.

In one embodiment, the first light incident on the transparent member is composed only of p-polarized light.

In one embodiment, given a reflectance $r^0_p$ for p-polarized light when light which is perpendicular to the transparent member is incident on the transparent member, the incident angle $\theta$ is an incident angle $\theta_1$ such that a reflectance $r_p(\theta)$ of the p-polarized light is equal to or less than $r^0_p/2$.

In one embodiment, the incident angle $\theta$ is Brewster's angle.

In any of the above embodiments according to the present invention, given a width a of one of the two specular elements of the optical system, a width b of the other specular element, and a height c of the two specular elements, and by defining an angle between a normal direction of the first principal face and an incident direction of second light incident on one of the specular elements an incident angle $\theta'$, the incident angle $\theta'$ is expressed by the following equation, when $0° < \theta' < 90°$.

[math. 1]
$$\theta' = 90 - \tan^{-1}\left(\frac{c}{\sqrt{a^2+b^2}}\right)$$

In one embodiment, defining an imaging efficiency of the optical system whose incident angle $\theta'$ is expressed by the above equation to be 1, and defining an angle between a normal direction of the first principal face and an incident direction of second light incident on one of the specular elements as an incident angle $\theta'$, the incident angle $\theta'$ is an incident angle $\theta_2$ such that the imaging efficiency is equal to or greater than 0.5 but less than 1 when $0° < \theta' < 90°$.

In one embodiment, the display panel is a liquid crystal display panel.

Advantageous Effects of Invention

According to the present invention, an optical system having a reflective imaging element in which reflected light not contributing to image formation is reduced and whose imaging efficiency is improved is provided.

BRIEF DESCRIPTION OF DRAWINGS

[FIG. 2] (a) is a schematic cross-sectional view of an optical element 10A which the optical system 100A includes; (b) is a schematic plan view of the optical element 10A; and (c) is a schematic plan view of an optical element 10B which the optical system 100B includes.

[FIGS. 3] (a) and (b) are schematic perspective views of unit imaging elements 12A and 12B, and are diagrams showing a light path.

[FIG. 4] (a) is a graph showing a relationship between incident angles of light and reflectance; (b) is a schematic cross-sectional view along line I-I' of the unit imaging element 12A, 12B in FIG. 3(a); and (c) is a graph showing a relationship between incident angles of light and imaging efficiency.

[FIG. 5] (a) is a partially-enlarged graph of the graph shown in FIG. 4(a); and (b) is a partially-enlarged graph of the graph shown in FIG. 4(c).

[FIGS. 6] (a) and (b) are diagrams for describing "imaging efficiency".

[FIG. 7] (a) is a schematic cross-sectional view showing diffuse reflection of light in the optical system 100A, 100B; and (b) is a schematic cross-sectional view showing portion E in the optical element 10A, 10B in (a) with enlargement.

[FIG. 9] (a) is a diagram for describing an incident angle and an outgoing angle of light at interfaces between air layer/transparent substrate/air layer; (b) is a diagram for describing an incident angle and an outgoing angle of light at an interface between air layer/transparent resin layer (a layer of a transparent solid or liquid); and (c) is a diagram for describing an incident angle and an outgoing angle of light at interfaces between air layer/transparent substrate/transparent resin layer (a layer of a transparent solid or liquid).

DESCRIPTION OF EMBODIMENTS

Hereinafter, embodiments of the present invention will be described with reference to drawings; however, the present invention is not limited to the illustrated embodiments.

Figure 1:
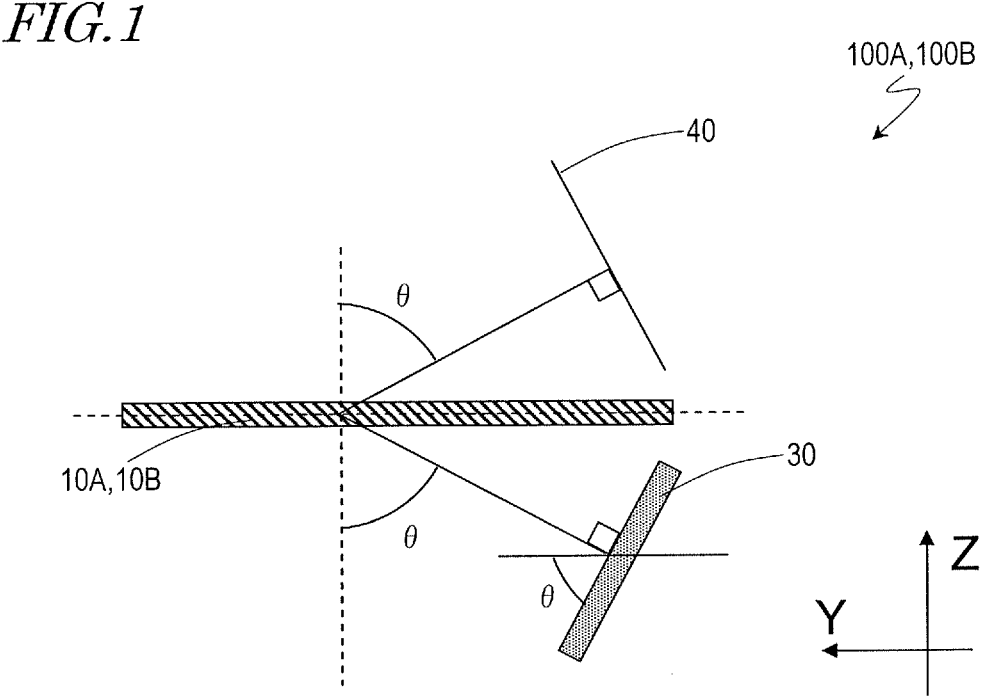
[FIG. 1] A schematic cross-sectional view showing the construction of optical systems 100A, 100B according to embodiments of the present invention.

With reference to FIG. 1, the construction of optical systems 100A and 100B according to embodiments of the present invention will be described. FIG. 1 is a schematic cross-sectional view showing the construction of the optical systems 100A and 100B.

The optical system 100A, 100B shown in FIG. 1 each includes a liquid crystal display panel 30 and an optical element 10A, 10B having a first principal face at which light emitted from the liquid crystal display panel 30 enters, second principal face which is parallel to the first principal face. The optical element 10A, 10B includes a reflective imaging element 11A, 11B, having a first principal face at which light emitted from the liquid crystal display panel 30 enters and a second principal face which is parallel to the first principal face. The optical system 100A, 100B causes an image which is displayed on a display surface of the liquid crystal display panel 30 to form an image at a position 40 of planar symmetry with respect to the optical element 10A, 10B as a plane of symmetry. The optical element 10A includes a transparent substrate 21, whereas the optical element 10B includes a transparent resin 23B. The reflective imaging element 11A, 11B has a known construction, such as a reflective imaging element disclosed in Patent Document 1, for example.

With reference to FIGS. 2(a) to (c), the construction of the optical element 10A, 10B will be described. The optical element 10A shown in FIG. 2(a) includes: a reflective imaging element 11A having a plate-like substrate, a plurality of throughholes penetrating through the substrate along its thickness direction, and two orthogonally-disposed specular elements 14a and 15a on inner walls of the plurality of throughholes; a substrate having a uniform thickness and transparency (hereinafter referred to as a transparent substrate) (e.g., an acrylic substrate) 21a, being provided on the first principal face of the reflective imaging element 11A; and a transparent substrate (an acrylic substrate) 21b provided on the second principal face of the reflective imaging element 11A. Preferably, the transparent substrates 21a and 21b are transparent only in the portions where light passes through, and otherwise has a light shielding layer of a metal or the like provided thereon. More preferably, a black resin layer or the like is formed on the transparent substrates 21a and 21b via photolithography or the like for absorbing light. One of the acrylic substrates 21a and 21b may be omitted. The reflective imaging element 11A has a thickness of 50 μm to 1000 μm, and thus is susceptible to deformation because of being very thin. Furthermore, the specular elements 14a and 15a included in the reflective imaging element 11A contain a metal, and in the case where silver (Ag) having a high reflectance is used, particularly prominent problems of surface oxidation, moisture adsorption, or impurity adhesion would occur. Therefore, providing the transparent substrate(s) 21a, 21b on at least one of the first principal face and the second principal face of the reflective imaging element 11A produces an advantage in that the planarity of the reflective imaging element 11A can be enhanced. Moreover, providing the transparent substrates 21a and 21b on the first principal face and the second principal face of the reflective imaging element 11A produces an advantage in that surface oxidation, moisture adsorption, or impurity adhesion of the specular elements 14a and 15a is prevented, whereby their optical properties can be maintained. The choice as to whether the transparent substrate(s) 21a, 21b is to be provided on both faces or one face of the reflective optical element 10A may be appropriately made, by taking into consideration the structure of the reflective imaging element 11A, the characteristics of the metal contained in the specular elements 14a and 15a, the environment of use, and so on. Moreover, the transparent substrates 21a and 21b, which for example may be acrylic substrates, may also be glass substrates such as quartz glass, soda-lime glass, borosilicate glass, or the like. The reflective imaging element 11A and the transparent substrates 21a and 21b are fixed with resin members 25. The resin members 25 at least have transparency, and more preferably have the same refractive index as that of the transparent substrates 21a and 21b or the transparent resin 23B described later, but are not limited to such.

The optical element 10B shown in FIG. 2(c) includes a reflective imaging element 11B having a plate-like substrate, a plurality of throughholes penetrating through the plate-like substrate along its thickness direction, and two orthogonal-disposed specular elements 14b and 15b on inner walls of the plurality of holes, such that the plurality of throughholes are filled with a transparent resin 23B having transparency (e.g., an acrylic resin). Filling the transparent resin 23B in the plurality of throughholes also provides the advantages of enhancing the planarity of the first principal face and maintaining the optical properties of the reflection surface. Moreover, a transparent substrate 21 (e.g., an acrylic substrate) may be provided on at least one of the first principal face and the second principal face of the reflective imaging element 11B. Other than acrylic resins, the transparent resin 23B may also be an epoxy resin or the like.

FIGS. 3(a) and (b) are schematic perspective views of the unit imaging element 12A, 12B which is included in the respective reflective imaging element 11A, 11B, and are schematic diagrams showing a light path (arrows 60). As shown in FIG. 3(a), the unit imaging element 12A has a throughhole 22A penetrating through the plate-like substrate along its thickness direction (z direction). The shape of the throughhole 22A as viewed from the normal direction of the reflective imaging element 11A is essentially rectangular (essentially square). The unit imaging element 12B is structured so that the throughhole 22A of the unit imaging element 12A is filled with the transparent resin 23B. On the inner wall surface of the throughhole 22A, two mutually-orthogonal specular elements 14 and 15 are formed. When light strikes the two specular elements 14 and 15 and is reflected (metallic reflection or total reflection), an image is formed in the air. The two other faces of the inner wall surface of the throughhole 22A besides the two specular elements 14 and 15 are non-mirror-finished so as not to reflect light, or angled, for example, so as to cause suppressed reflection. The unit imaging element 12A, 12B shown in FIGS. 3(a) and (b) is such that: a width a of one of the specular elements is preferably no less than 50 μm and no more than 1000 μm (e.g., 209 μm); a width b of the other specular element is preferably no less than 50 μm and no more than 1000 μm (e.g., 209 μm); and a height c of each of the two specular elements 14 and 15 is preferably no less than 50 μm and no more than 1000 μm (e.g., 160 μm).

When light emitted from the display surface of the liquid crystal display panel 30 strikes the unit imaging element 12A, 12B, for example, as indicated by the arrows 60 in FIGS. 3(a) and (b), it is reflected (metallic reflection or total reflection) by the two mutually-orthogonal specular elements 14 and 15, and causes an image on the display surface of the liquid crystal display panel 30 to be formed at the position 40 of planar symmetry, with respect to the reflective imaging element 11A, 11B as a plane of symmetry. When reflected light not contributing to image formation occurs due to the transparent substrate 21 (or the transparent resin 23B), the contrast ratio of the aerial image is reduced and the visual recognition is also deteriorated.

Next, a method for suppressing reflected light not contributing to image formation will be described.

In the optical system 100A, 100B, a principal ray of first light (also referred to as incident light) which is emitted from the liquid crystal display panel 30 and strikes the first principal face of the optical element 10A, 10B is linearly polarized light. Defining the angle between the normal direction of the transparent substrate 21 (or the transparent resin 23B) and the direction of the first light striking the transparent substrate 21 (or the transparent resin 23B) as an incident angle, it is ensured that a proportion $R_p$ of p-polarized light satisfies $R_p \times r_p(\theta) < r_0 \times (R_p + R_s) - R_s \times r_s(\theta)$ (hereinafter eq. (1)), where $r_0$ is a reflectance for light perpendicular to the transparent substrate 21 (or the transparent resin 23B) when striking the transparent substrate 21 (or the transparent resin 23B), and, of the first light when striking the transparent substrate 21 (or the transparent resin 23B) at an incident angle $\theta$, $r_p(\theta)$ is a reflectance for p-polarized light (i.e., a light component which oscillates in parallel to the plane of incidence); $R_p$ is a proportion of the p-polarized light; $r_s(\theta)$ is a reflectance for s-polarized light of the first light; and $R_s$ is a proportion of the s-polarized light. Note that, in the range $0° < \theta < 90°$, $0 \le R_p$, $R_s \le 1$, $R_p + R_s = 1$, $0 < r_0 < 1$, $0 \le r_p(\theta) < 1$, $0 < r_s(\theta) < 1$ are satisfied.

Since the principal ray of the incident light satisfies the aforementioned relationship, the proportion of the p-polarized light, which receives a small reflectance, becomes greater than the proportion of the s-polarized light, which receives a large reflectance. Therefore, reflected light can be suppressed at the plurality of interfaces between media of different refractive indices, so that the efficiency of light utility is enhanced and the stray light is suppressed, whereby the aerial image can have an improved visual recognition. It is more preferable if the principal ray of incident light is composed only of p-polarized light, because reflected light at the interface(s) will be further suppressed.

Next, the incident angle when light which is emitted from a display panel (e.g., the liquid crystal display panel 30) strikes the transparent substrate 21 or the transparent resin 23B which is included in the optical element 10A, 10B will be described.

FIG. 4(a) is a graph showing a relationship between incident angles of light and reflectance at an interface between an acrylic substrate (refractive index: 1.49) and air. Note that this graph is obtained through a simulation. It can be seen that, with the incident angle of light on the acrylic substrate, s-polarized light (i.e., a light component which oscillates perpendicularly to the plane of incidence) and p-polarized light differ in reflectance.

FIG. 5(a) is a partially-enlarged graph of the graph shown in FIG. 4(a). As can be seen from FIG. 5(a), the reflectance is smaller for p-polarized light than for s-polarized light. In particular, $\theta_B$ in the figure represents Brewster's angle; when light enters at this angle, no reflected light occurs because there is zero reflectance for p-polarized light, whereby the contrast ratio of the aerial image is enhanced and high visual recognition will be obtained. Even if the incident angle is not Brewster's angle $\theta_B$, within a range of incident angles corresponding to a half or less (i.e., 0.02 or less) of the reflectance (0.04) for p-polarized light when the incident angle is 0° in the graph, the aerial image has a high contrast ratio and there is high visual recognition. Such a range of incident angles $\theta_B'$ is $\theta_B - \text{bm} \le \theta_B' \le \theta_B + \text{bp}$ ($0° < \theta_B' < 90°$).

Next, imaging efficiency will be discussed. In the present specification, "imaging efficiency" is defined by eq. (2).

$$\text{Imaging efficiency}(\%) = A_p \times RA_1 \times RA_2 \times Rf^2 \times 100 \quad (2)$$

Herein, $A_p$ is an aperture ratio of throughholes at the first principal face side of the reflective imaging element 11A, 11B (or the proportion of the transparent resin 23B portion, which may hereinafter be referred to as the "throughhole aperture ratio"); $RA_1$ is a proportion of the effective area at the first reflection; $RA_2$ is a proportion of the effective area at the second reflection; and $Rf$ is a specular reflectance of the specular element 14, 15. A proportion of a reflection effective area is obtained by dividing the geometric area of the reflection effective area by the geometric area of an area which is irradiated with incident light (proportion of reflection effective area=geometric area of reflection effective area/geometric area of area which is irradiated with incident light). As the imaging efficiency becomes closer to 100%, the light striking the reflective imaging element 11A, 11B is more efficiently utilized to form an image in the air.

FIGS. 6(a) and (b) are diagrams for specifically describing imaging efficiency. In these figures, it is assumed that the light incident on the reflective imaging element 11A, 11B first strikes the specular element 14, and reflected light thereof strikes the other specular element 15, and reflected light thereof contributes to image formation. It is assumed that the throughhole aperture ratio at the first principal face side (the light incident side) is 0.91, and that the specular reflectance is 1. Moreover, it is assumed that the light source provides collimated light with a uniform intensity distribution. FIG. 6(a) is a schematic plan view showing the reflection effective areas and irradiated areas of the two specular elements 14 and 15 at an imaging efficiency of 91% (incident angle: 61.6°). As is indicated in the figure, since the effective area at the first reflection and the irradiated area are equal, the proportion $RA_1$ of the effective area at the first reflection is 1. Since the effective area at the second reflection and the irradiated area are equal, the proportion $RA_2$ of the effective area at the second reflection is 1. Therefore, from eq. (2), above, the imaging efficiency is derived to be 91%, which is a high efficiency. FIG. 6(b) is a schematic plan view showing the reflection effective areas and irradiated areas of the two specular elements 14 and 15 at an imaging efficiency of 51% (incident angle: 54.0°). As is indicated in the figure, since the irradiated area is greater than the effective area at the first reflection, the proportion $RA_1$ of the effective area at the first reflection is as small as 0.56. Since the effective area at the second reflection and the irradiated area are equal, the proportion $RA_2$ of the effective area at the second reflection is 1. Therefore, from eq. (2) above, the imaging efficiency is derived to be 51%, which is a low efficiency.

FIG. 4(b) is a diagram for describing an optimum incident angle of light striking the first principal face of the reflective imaging element 11A, 11B. Assuming that, between the two specular elements 14 and 15 of the unit imaging element 12A, 12B, one specular element has a width a and the other specular element has a width b, and the two specular elements 14 and 15 have a height c, and defining the angle between the normal direction of the first principal face and the incident direction of second light striking one of the specular elements (14 or 15) as an incident angle $\theta'$, an optimum incident angle $\theta_A$ which is in favor of imaging efficiency is expressed by eq. (3) below, when $0° < \theta' < 90°$. Moreover, given an incident angle $\theta$ of the first light, an optimum viewing position would be at (90−$\theta$) degrees above the second principal face of the optical element 10A, 10B (see FIG. 1(a)).

[math. 2]

$$\theta_A = 90 - \tan^{-1}\left(\frac{c}{\sqrt{a^2 + b^2}}\right) \quad 0° < \theta_A < 90° \quad (3)$$

FIG. 4(c) is a graph showing an imaging efficiency when collimated light strikes one specular element (14 or 15) of the reflective imaging element 11A, 11B at various incident angles. This graph is obtained through a simulation. In this case, the angle represented by eq. (3) above is an angle indicated as "$\theta_A$" in the graph. As can be seen from FIG. 4(c), there is a narrow range of incident angles that produces a high imaging efficiency. Moreover, a value obtained by subtracting the imaging efficiency from the throughhole aperture ratio at the first principal face side (aperture ratio–imaging efficiency) indicates the proportion of stray light; therefore, in the case where the display panel is used as an object, setting the outgoing angle of a principal ray going out from the display panel at a desired angle is more preferable in terms of avoiding stray light and attaining a high imaging efficiency.

FIG. 5(b) is a partially-enlarged graph of the graph shown in FIG. 4(c). Assuming that an optical system satisfying eq. (3) above has an imaging efficiency of 1, efficient image formation with light is possible while the imaging efficiency is in the range of no less than 0.5 and no more than 1, whereby a high contrast ratio is obtained and an aerial image which provides high visual recognition is obtained. An angle indicated as "$\theta_A$" in FIG. 5(b) is the incident angle when the imaging efficiency is highest. Since the imaging efficiency at this point is 0.90, a high contrast ratio shall be obtained and an aerial image which provides high visual recognition shall be obtained in a range of incident angles $\theta_A'$ such that the imaging efficiency is no less than 0.45 and no more than 0.90. As indicated in the figure, $\theta_A'$ satisfies $\theta_A - \theta_{HWHM} \theta_A \leq \theta_A' \leq \theta_A + \theta_{HWHM}$ ($0° < \theta_A' < 90°$). Therefore, the liquid crystal display panel 30, which permits control of the viewing angle, is preferably used as the display panel, for example. Otherwise, an organic EL (Electro Luminescence) display, a plasma display, a projector, or an LED (Light Emitting Diode) display, described later, can be used as the display panel.

FIG. 7(a) is a schematic cross-sectional view showing an optical system 100C in which a light source (e.g., an organic EL panel) 31 other than a liquid crystal panel 30 is used as the light source, and is a schematic diagram showing a light path (arrows 61). FIG. 7(b) is a schematic cross-sectional view showing portion E in (a) with enlargement.

As shown in FIG. 7(a), the contrast ratio of an aerial image is represented by a ratio between the maximum luminance (white) and the minimum luminance (black). The maximum luminance is measured at an imaging plane 41, whereas the minimum luminance is measured at the surface of the optical element 10A, 10B (V). In the case of the optical system 100C, the light source 31 (a light source with unpolarized light, e.g., an organic EL panel) and the optical element 10A, 10B are not parallel, and therefore incident light is reflected at the material with which the optical element 10A, 10B is retained (e.g., acrylic substrate), as shown in FIG. 7(b). Furthermore, diffuse reflection occurring at the surface of a housing 90 or the like increases the minimum luminance, thus lowering the contrast ratio. Moreover, outgoing light from the reflective imaging element 11A, 11B is also reflected by the retaining material. In this case, diffuse reflection occurs within the optical element 10A, 10B, so that the contrast ratio and visual recognition of the aerial image are deteriorated due to stray light. Therefore, in order to improve the contrast ratio and visual recognition of the aerial image even in the case of using this other light source 31 (e.g., an organic EL panel), a polarizer or the like is used between the light source 31 and the optical element 10A, 10B to control incident light, so that p-polarized light is obtained at the surface of light incidence.

In the case where a display panel which does not permit easy viewing angle control, e.g., an organic EL display or a plasma display, is used instead of a liquid crystal display panel 30, a display panel which is adapted to the desired viewing angle needs to be obtained by using a viewing angle controlling film (e.g., Light Control Film manufactured by Sumitomo 3M Limited). Furthermore, in the case where a projector or an LED display is used as the display panel, there is strong light directivity and a narrow viewing angle, so that a lens or the like for angling the rays (broadening the viewing angle) needs to be employed between the display panel and the optical element 10A, 10B.

Next, incident light characteristics for increasing the imaging efficiency will be discussed.

In the case where the aforementioned optical element 10A, 10B is used, the two following patterns of optical paths are possible.

Pattern 1: air layer/transparent substrate (e.g., an acrylic substrate)/air layer/reflection surface/air layer/reflection surface/air layer/transparent substrate (e.g., an acrylic substrate)/air layer Pattern 2: air layer/transparent material (e.g., a transparent resin and acrylic substrate, or a transparent resin)/reflection surface/transparent material (e.g., a transparent resin)/reflection surface/transparent material (e.g., a transparent resin and acrylic substrate, or a transparent resin)/air layer In each of these two patterns, there is more than one air layer/transparent substrate (or transparent material) interface of different refractive indices, and the reflection occurring at these interfaces lowers the efficiency of light utility (and also causes stray light). Therefore, it is important to suppress reflection at any interface between air layer/transparent substrate (or transparent material) of different refractive indices.

Therefore, in order to improve the efficiency of light utility, the inventors have dictated that the proportion of p-polarized light in the light being emitted from the display panel and incident on the first principal face of the optical element 10A, 10B satisfies the relationship of eq. (1), or that the incident light is composed only of p-polarized light.

From FIG. 4(a), it can be seen that, with the incident angle of light on the acrylic substrate, s-polarized light and p-polarized light differ in reflectance. Therefore, the incident light is preferably such that the proportion of p-polarized light therein satisfies the relationship of eq. (1), and more preferably is composed only of p-polarized light. Moreover, as for the incident angle of light striking the transparent substrate 21 (or the transparent resin 23B), the light preferably strikes in a range of incident angles $\theta_B'$ such that the reflectance for the p-polarized light is equal to or less than a half of the reflectance when it perpendicularly strikes the transparent substrate 21 (or the transparent resin 23B), and more preferably the light strikes at Brewster's angle $\theta_B$. As a result, it becomes possible to suppress reflected light not contributing to image formation, and reduce a decrease in the contrast ratio of the aerial image.

Figure 8:
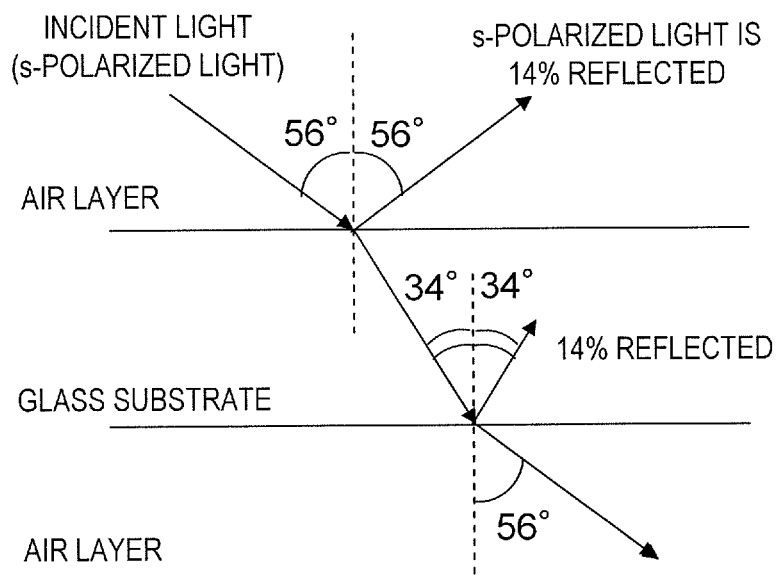
[FIG. 8] A diagram for describing an incident angle, an outgoing angle, a reflection angle, and reflectance of s-polarized light at each interface between air layer/acrylic substrate/air layer.

FIG. 8 is a schematic cross-sectional view for describing an incident angle, an outgoing angle, a reflection angle, and reflectance of s-polarized light at each interface between air layer/acrylic substrate/air layer. For example, when the incident angle is 56° (Brewster's angle), the reflectance for p-polarized light at the air layer/acrylic substrate interface is substantially 0% as shown in FIG. 4(a), and the reflectance for s-polarized light is 14%. The transmittance for s-polarized light when light passes through one acrylic substrate is 74% (0.86×0.86×100), which is 26% smaller than the transmittance of 100% for p-polarized light. This means that, if the incident light is p-polarized light, and the p-polarized light strikes at Brewster's angle $\theta_B$, a 26% higher efficiency is obtained than in the case of incident light which is composed only of s-polarized light.

In the two aforementioned optical path patterns, if the transparent substrate 21 (or the transparent resin 23B) all has the same refractive index, the image formation light intensity will be, respectively, Pattern 1: image formation light intensity=incident light intensity×imaging efficiency×(metal reflectance)²×(1−interface reflectance)⁴

Pattern 2: image formation light intensity=incident light intensity×imaging efficiency×(metal reflectance)²×(1−interface reflectance)².

Thus, zeroing the interface reflectance will be a factor for increasing the image formation light intensity.

FIG. 9(a) is a schematic cross-sectional view for describing a path of light (arrows) when it strikes the transparent substrate 21, this light going out through the transparent substrate 21, and the outgoing light striking the reflective imaging element 11A (whose throughholes 22A are filled with air). Since the throughholes 22A in the reflective imaging element 11A are filled with air, the incident angle of light ($\theta_1$) and the outgoing angle ($\theta_2$) are equal ($\theta_1=\theta_2$). It is most preferable that the incident angle $\theta_1$ of the light striking the transparent substrate 21 is Brewster's angle $\theta_B$. The incident angle $\theta_2$ of the light striking one specular element 14a (or 15a) which is included in the reflective imaging element 11A is most preferably the incident angle $\theta_A$. Therefore, the structure of the reflective imaging element 11A (width a, width b, and height c of the unit imaging element 12A in FIGS. 3(a) and (b)) and the refractive index n of the transparent substrate 21 are determined so as to satisfy this. Specifically, since the refractive index of air is 1 and the refractive index of the transparent substrate 21 is n, Brewster's angle $\theta_B$ is found to be $\theta_B=\tan^{-1}(n)$. Moreover, $\theta_A$ is expressed by eq. (3) above. Therefore, from $\theta_A=\theta_B$, the width a, width b, and height c of the unit imaging element 12A and the refractive index n of the transparent substrate 21 satisfy eq. (4) below.

[math. 3]

$$\tan^{-1}(n) = 90 - \tan^{-1}\left(\frac{c}{\sqrt{a^2+b^2}}\right) \quad (4)$$

From manufacturing conveniences of the reflective imaging element 11A and the refractive index constraints on the transparent substrate 21 and the like, the incident angle $\theta_1$ on the transparent substrate 21 (or the transparent resin 23B) may be the aforementioned incident angle $\theta_B$ ($\theta_B-bm \leq \theta_B' \leq \theta_B+bp$). Moreover, the incident angle $\theta_2$ on the specular element 14a (or 15a) included in the reflective imaging element 11A may also be the aforementioned incident angle $\theta_A'$ ($\theta_A-\theta_{HWHM} \leq \theta_A' \leq \theta_A+\theta_{HWHM}$). So, they may be of the relationship satisfying $\theta_1=\theta_2=\theta_B'=\theta_A'$; the structure of the unit imaging element 12A is to be accordingly determined.

FIG. 9(b) is a schematic cross-sectional view for describing a path of light (arrows) when it strikes the transparent resin 23B (or transparent liquid or solid) included in the reflective imaging element 11B. The transparent resin 23B (or transparent liquid or solid) has a refractive index n. In this case, the optimum incident angle $\theta_1'$ of the light striking the transparent resin 23B is Brewster's angle $\theta_B=\tan^{-1}(n)$. The optimum incident angle $\theta_2'$ of light striking one specular element 14b (or 15b) included in the reflective imaging element 11B is the incident angle $\theta_A$. The incident angle $\theta_2'$ and the incident angle $\theta_1'$ are of the relationship expressed by eq. (5) below. Since $\theta_2'=\theta_A$, $\theta_1'=\theta_B$, the relationship of eq. (6) below is satisfied. Therefore, the refractive index of the transparent resin 23B (or transparent liquid or solid) and the unit imaging element 12B (width a, width b, height c of the unit imaging element 12B in FIGS. 3(a) and (b)) are determined so as to satisfy eq. (6) below.

[math. 4]

$$\sin\theta_2' = \frac{\sin\theta_1'}{n} \quad (5)$$

[math. 5]

$$\sin\theta_A = \frac{\sin\theta_B}{n} \quad (6)$$

However, from manufacturing conveniences of the reflective imaging element 11B and refractive index constraints and the like, a relationship of eq. (7) below may be exploited, based on $\theta_2'=\theta_A'$, $\theta_1'=\theta_B'$.

[math. 6]

$$\sin\theta_A' = \frac{\sin\theta_B'}{n} \quad (7)$$

FIG. 9(c) is a schematic cross-sectional view showing a path of light (arrows) when it strikes the transparent substrate 21 and strikes the transparent resin 23B (or transparent liquid or solid) included in the reflective imaging element 11B. It is assumed that the transparent substrate 21 has a refractive index n and that the transparent resin 23B (or transparent liquid or solid) has a refractive index n'. In this case, preferably, the optimum incident angle $\theta_1''$ of the light striking the transparent substrate 21 is Brewster's angle $\theta_B=\tan^{-1}(n)$, and the optimum incident angle $\theta_2''$ of light striking one specular element 14b (or 15b) included in the reflective imaging element 11B is the incident angle $\theta_A$. The incident angle $\theta_2''$ and the incident angle $\theta_1''$ have the relationship of eq. (8) below. Since $\theta_2''=\theta_A$, $\theta_1''=\theta_B$, the relationship of eq. (9) below is satisfied. Therefore, the refractive indices of the transparent substrate 21 and the transparent resin 23B (or transparent liquid or solid) and the unit imaging element 12B (width a, width b, height c of the unit imaging element 12B in FIGS. 3(a) and (b)) are determined so as to satisfy eq. (9) below.

[math. 7]

$$\sin\theta_2'' = \frac{\sin\theta_1''}{n'} \quad (8)$$

[math. 8]

$$\sin\theta_A = \frac{\sin\theta_B}{n'} \quad (9)$$

However, from manufacturing conveniences of the reflective imaging element 11B and refractive index constraints and the like, a relationship of eq. (10) below may be exploited, based on $\theta_2''=\theta_A'$, $\theta_1''=\theta_B'$.

[math. 9]

$$\sin\theta_A' = \frac{\sin\theta_B'}{n'} \quad (10)$$

As described above, in accordance with the optical system 100A, 100B of embodiments of the present invention, there is obtained an optical system having a reflective imaging element in which reflected light not contributing to image formation is suppressed and whose imaging efficiency is improved.

The optical systems of the aforementioned embodiments include a liquid crystal display panel emitting linearly polarized light as the display panel. However, without being limited thereto, a liquid crystal display panel emitting circularly polarized light or elliptically polarized light, or a display panel emitting unpolarized light can also be used in an optical system according to an embodiment of the present invention. In the case where any such display panel is used, a polarizer or the like may be provided between the surface of the display panel and a transparent substrate or transparent member for effecting conversion into linearly polarized light.

Industrial Applicability

The present invention is broadly applicable to any optical system which has a reflective imaging element capable of forming an image of an object in a space and a display panel.

REFERENCE SIGNS LIST 10A, 10B optical element
11A, 11B reflective imaging element
12A, 12B unit imaging element
14, 14a, 14b, 15, 15a, 15b specular element
21, 21a, 21b transparent substrate
22A throughhole
23B transparent resin
30 liquid crystal display panel
40 position of image formation
100A, 100B, 100C optical system

The invention claimed is:

1. An optical system comprising:
a display panel; and
a reflective imaging element having a first principal face on which light emitted from the display panel is incident, a second principal face parallel to the first principal face, and two mutually-orthogonal specular elements being perpendicular to the first principal face,
the optical system causing an image displayed on a display surface of the display panel to form an image at a position of planar symmetry with respect to the reflective imaging element as a plane of symmetry, wherein,
the optical system further comprises a transparent substrate which is disposed on at least either the first principal face side or the second principal face side of the reflective imaging element;
first light incident on the transparent substrate is linearly polarized light; and,
given a proportion $R_p$ of p-polarized light and a proportion $R_s$ of s-polarized light in the first light incident on the transparent substrate,
the proportion $R_p$ of p-polarized light satisfies $R_p \times r_p(\theta) < r_0 \times (R_p + R_s) - R_s \times r_s(\theta)$, where: $r_0$ is a reflectance for light perpendicularly incident on the transparent substrate; and $r_p(\theta)$ is a reflectance for p-polarized light, and $r_s(\theta)$ is a reflectance for s-polarized light, of the first light when the first light is incident on the transparent substrate at an incident angle $\theta$.

2. The optical system of claim 1, wherein the reflective imaging element includes a plate-like substrate having a plurality of throughholes along a thickness direction, and includes a transparent member filling the plurality of holes, and includes the transparent substrate only on the first principal face side, or on both the first principal face side and the second principal face side.

3. The optical system of claim 1, wherein the first light incident on the transparent substrate is composed only of p-polarized light.

4. The optical system of claim 1, wherein, given a reflectance $r^0_p$ for p-polarized light when light which is perpendicular to the transparent substrate is incident on the transparent substrate, the incident angle $\theta$ is an incident angle $\theta_1$ such that a reflectance $r_p(\theta)$ of the p-polarized light is equal to or less than $r^0_p/2$.

5. The optical system of claim 4, wherein the incident angle $\theta$ is Brewster's angle.

6. The optical system of claim 1, wherein,
given a width a of one of the two specular elements, a width b of the other specular element, and a height c of the two specular elements, and by defining an angle between a normal direction of the first principal face and an incident direction of second light incident on one of the specular elements an incident angle $\theta'$,
the incident angle $\theta'$ is expressed by the following equation, when $0° < \theta' < 90°$

[math. 1]
$$\theta' = 90 - \tan^{-1}\left(\frac{c}{\sqrt{a^2 + b^2}}\right).$$

7. The optical system of claim 1, wherein,
defining an imaging efficiency of the optical system of claim 6 to be 1, and
defining an angle between a normal direction of the first principal face and an incident direction of second light incident on one of the specular elements as an incident angle $\theta'$, the incident angle $\theta'$ is an incident angle $\theta_2$ such that the imaging efficiency is equal to or greater than 0.5 but less than 1 when $0° < \theta' < 90°$.

8. The optical system of claim 1, wherein the display panel is a liquid crystal display panel.

9. An optical system comprising:
a display panel; and
a reflective imaging element having a first principal face on which light emitted from the display panel is incident, a second principal face parallel to the first principal face, and two mutually-orthogonal specular elements being perpendicular to the first principal face,
the optical system causing an image displayed on a display surface of the display panel to form an image at a position of planar symmetry with respect to the reflective imaging element as a plane of symmetry, wherein,
the reflective imaging element includes a plate-like substrate having a plurality of throughholes along a thickness direction, and a transparent member filling the plurality of holes,
first light incident on the transparent member is linearly polarized light; and,
given a proportion $R_p$ of p-polarized light and a proportion $R_s$ of s-polarized light in the first light incident on the transparent member,
the proportion $R_p$ of p-polarized light satisfies $R_p \times r_p(\theta) < r_0 \times (R_p + R_s) - R_s \times r_s(\theta)$, where: $r_0$ is a reflectance for light perpendicularly incident on the transparent member; and $r_p(\theta)$ is a reflectance for p-polarized light, and $r_s(\theta)$ is a reflectance for s-polarized light, of the first light when the first light is incident on the transparent member at an incident angle $\theta$.

10. The optical system of claim 9, further comprising a transparent substrate disposed on the second principal face side of the reflective imaging element.

11. The optical system of claim 9, wherein the first light incident on the transparent member is composed only of p-polarized light.

12. The optical system of claim 9, wherein, given a reflectance $r^o_p$ for p-polarized light when light which is perpendicular to the transparent member is incident on the transparent member, the incident angle θ is an incident angle $θ_1$ such that a reflectance $r_p(θ)$ of the p-polarized light is equal to or less than $r^o_p/2$.

13. The optical system of claim 12, wherein the incident angle θ is Brewster's angle.

14. The optical system of claim 9, wherein,
given a width a of one of the two specular elements, a width b of the other specular element, and a height c of the two specular elements, and by defining an angle between a normal direction of the first principal face and an incident direction of second light incident on one of the specular elements an incident angle θ',
the incident angle θ' is expressed by the following equation, when 0°<θ'<90°

$$θ' = 90 - \tan^{-1}\left(\frac{c}{\sqrt{a^2+b^2}}\right).$$

15. The optical system of claim 9, wherein,
defining an imaging efficiency of the optical system of claim 6 to be 1, and
defining an angle between a normal direction of the first principal face and an incident direction of second light incident on one of the specular elements as an incident angle θ', the incident angle θ' is an incident angle $θ_2$ such that the imaging efficiency is equal to or greater than 0.5 but less than 1 when 0°<θ'<90°.

16. The optical system of claim 9, wherein the display panel is a liquid crystal display panel.

* * * * *